(12) United States Patent
Takezawa et al.

(10) Patent No.: US 7,017,997 B2
(45) Date of Patent: Mar. 28, 2006

(54) SEAT

(75) Inventors: Kiyoshi Takezawa, Kanagawa (JP); Mikio Yamaguchi, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 10/614,130

(22) Filed: Jul. 8, 2003

(65) Prior Publication Data

US 2005/0173964 A1    Aug. 11, 2005

(30) Foreign Application Priority Data

Jul. 8, 2002    (JP) .......................... P.2002-199132

(51) Int. Cl.
*A47C 7/02*    (2006.01)
(52) U.S. Cl. .................................. 297/452.6
(58) Field of Classification Search .............. 297/452.6
See application file for complete search history.

(56) References Cited

U.S. PATENT DOCUMENTS

| | | | | |
|---|---|---|---|---|
| 3,630,572 A | * | 12/1971 | Homier .................... | 297/452.6 |
| 3,632,164 A | * | 1/1972 | Radke ...................... | 297/452.6 |
| 3,649,974 A | * | 3/1972 | Baruth et al. .................. | 5/402 |
| 3,961,823 A | * | 6/1976 | Caudill, Jr. .............. | 297/452.6 |
| 4,317,591 A | * | 3/1982 | Ramsey .................... | 297/452.6 |
| 4,337,931 A | * | 7/1982 | Mundell et al. ............ | 267/102 |
| 4,379,352 A | * | 4/1983 | Hauslein et al. ......... | 297/452.6 |
| 4,558,905 A | * | 12/1985 | Natori ..................... | 297/452.6 |
| 4,718,718 A | * | 1/1988 | Maruyama ............. | 297/180.12 |
| 5,641,204 A | * | 6/1997 | Lhuissier et al. ........ | 297/452.6 |
| 5,993,955 A | * | 11/1999 | Mense ...................... | 428/317.9 |
| 6,003,939 A | * | 12/1999 | Nakai et al. ........... | 297/216.13 |
| 6,048,025 A | * | 4/2000 | Tillner ..................... | 297/218.1 |

FOREIGN PATENT DOCUMENTS

EP    280148 A1 *    8/1988

* cited by examiner

*Primary Examiner*—Peter M. Cuomo
*Assistant Examiner*—Sarah B. McPartlin
(74) *Attorney, Agent, or Firm*—Jean C. Edwards, Esq.; Akerman Senterfitt

(57) ABSTRACT

A vehicle seat includes pad and cover assemblies. The pad assembly has a main portion and side portions. The side portions are placed opposite sides of the main portion through boundary-portion pulling slots respectively. The main-portion pulling slot crossing the boundary-portion pulling slots is formed in the main portion. The cover assembly includes boundary-portion pulling bags pulled into the boundary-portion pulling slots respectively and a main-portion pulling bag pulled into the main-portion pulling slot. The vehicle seat includes boundary-portion insert wires embedded along bottom portions of the boundary-portion pulling slots respectively; boundary-portion end wires inserted into the boundary-portion pulling bags and fixed to the boundary-portion insert wires respectively; and a main-portion end wire inserted into the main-portion pulling bag. The main-portion end wire has opposite end portions bent and is forced into the main-portion pulling slot with the bent opposite end portions linked with the boundary-portion end wires respectively.

13 Claims, 4 Drawing Sheets

SEAT

This application claims priority from Japanese Patent Application No. 2002-199132, filed Jul. 8, 2002, the entire contents of which are herein incorporated by reference to the extent allowed by law.

BACKGROUND OF THE INVENTION

The present invention relates to a seat, particularly to a vehicle seat in which a pad assembly is covered with a cover assembly.

In a vehicle seat such as a front seat of a vehicle in the related art, side portions contiguous to the opposite sides of a main portion that is interposed between the side portions are formed as somewhat high banks. A method using pulling wires as shown in FIGS. 5 and 6 prevails in covering of such a seat. In this case, a cover assembly 11 having side portions 11a and a main portion 11b seamed together in their boundary portion is put over a pad assembly 12. Thus, a vehicle seat is formed.

In such a vehicle seat, each bank-like side portion is higher than the main portion. Therefore, unless the boundary portions (concave shapes) between the side portions 11a and the main portion 11b of the cover assembly 11 and the intermediate portion of the main portion 11b are fixed, the cover assembly 11 may rise away from the pad assembly 12 in the boundary portions and in the intermediate portion. Thus, the exterior appearance may be degraded. To prevent such a problem, the following structure is adopted.

That is, FIG. 5 is a perspective view of a seat viewed from above the seat (from the front side) for explaining a vehicle seat covering method in the related art, and FIG. 6 is a perspective view of the arrangement of end wires viewed from above the seat (from the front side).

In the pad assembly 12, boundary-portion pulling slots 12c and 12c for pulling the cover assembly 11 are formed in the boundary portions between the opposite side portions 12a and the main portion 12b so as to extend in the front/rear direction, while a main-portion pulling slot 12d is formed in the intermediate portion of the main portion 12b so as to extend in a direction crossing the boundary-portion pulling slots 12c and 12c.

Boundary-portion insert wires 16 and 16 and a main-portion insert wire 17 are embedded in the bottom portions of the pulling slots 12c, 12c and 12d respectively.

On the other hand, boundary-portion pulling bags 11c and 11c and a main-portion pulling bag 11d each having a cylindrical shape are sewn on the back of the cover assembly 11.

The boundary-portion pulling bags 11c and 11c are pulled into the boundary-portion pulling slots 12c and 12c of the pad assembly 12, while the main-portion pulling bag 11d is pulled into the main-portion pulling slot 12d of the pad assembly 12.

The boundary-portion pulling bags 11c and 11c are sewn and paired left and right to be located in the boundary portions between the opposite side portions 11a and the main portion 11b in the cover assembly 11 respectively. Each of the left and right boundary-portion pulling bags 11c and 11c is divided into two in the front/rear direction of the seat.

Boundary-portion end wires 14 and 15 shown in FIG. 6 and corresponding to boundary-portion insert wires 16 and 16 are inserted into the divided pieces of each of the left and right boundary-portion pulling bags 11c and 11c.

On the other hand, a main-portion end wire 13 shown in FIG. 6 and corresponding to the main-portion insert wire 17 is inserted into the main-portion pulling bag 11d.

The vehicle seat is assembled as follows. That is, the cover assembly 11 is put over the surface of the pad assembly 12. Then, the boundary-portion pulling bags 11c and 11c having the boundary-portion end wires 14 and 15 inserted thereto on the opposite sides are pulled into the boundary-portion pulling slots 12c and 12c of the pad assembly 12. On the other hand, the main-portion pulling bag 11d having the main-portion end wire 13 inserted thereto is pulled into the main-portion pulling slot 12d of the pad assembly 12. Then, the boundary-portion end wires 14 and 15 on the opposite sides are fixed to the boundary-portion insert wires 16 and 16 of the pad assembly 12. On the other hand, the main-portion end wire 13 is fixed to the main-portion insert wire 17 of the pad assembly 12.

The fixation of the wires 13, 14 and 15 to the wires 17, 16 and 16 is performed by pulling hog rings 18 such as C-rings on the insert wires 17, 16, and 16 corresponding to the end wires 13, 14 and 15 as shown by the arrows in FIG. 5. When the hog rings 18 are used, each end wire 13, 14, 15 and each insert wire 17, 16, 16 are fixed at a plurality of places in their length direction because of the necessity of preventing the cover assembly 11 from rising away from the pad assembly 12. In FIG. 5, fixation on each boundary-portion insert wire 16, 16 is performed at four places, and fixation on the main-portion insert wire 17 is performed at two places. Thus, fixation is performed at 10 placed in total.

Such a technique in the related art has the following problems.

A complicated configuration as described above is required for preventing the cover assembly from rising away from the pad assembly in the boundary portions (concave shapes) between the main portion and the side portions of the seat.

Recently, in order to improve the exterior appearance of the seat, there is a tendency to make the bank portions higher, make the pulling slots deeper (deeper pulling) and made the pulling slot narrower. Thus, the workability in pulling and fixation using a hog ring gun, that is a tool for the hog rings, becomes worse and worse.

Thus, there is a problem that the cost and the weight increases due to a large number of complicated constituent parts for pulling, and the number of man-hours for the work of pulling is large.

SUMMARY OF THE INVENTION

In order to solve such problems, it is an object of the invention to provide a vehicle seat in which the number of constituent parts for pulling and the number of man-hours in the work of pulling are reduced with a simple mechanism, and a cover assembly of the seat covers a pad assembly in close contact therewith and along the shape thereof, so that the exterior appearance of the vehicle seat is attractive.

In order to solve the problems, according to the invention, there is provided a seat comprising:

a pad assembly having a main portion and side portions, the main portion interposed between the side portions, the side portions including boundary-portion pulling slots wherein boundary-portion insert wires are disposed along bottom portions of the boundary-portion pulling slots, and the main portion including a main-portion pulling slot disposed substantially perpendicular to the boundary-portion pulling slots;

a cover assembly covering a surface of the pad assembly, the cover assembly including boundary-portion pulling bags pulled into the boundary-portion pulling slots respectively and a main-portion pulling bag pulled into the main-portion pulling slot, wherein boundary-portion end wires are inserted into the boundary-portion pulling bags and fixed to the boundary-portion insert wires respectively; and a main-portion end wire inserted into the main-portion pulling bag, the main-portion end wire having opposite end portions bent, the main-portion end wire being placed into the main-portion pulling slot with the bent opposite end portions linked with the boundary-portion end wires respectively.

Further, each of the boundary-portion end wires to be inserted into the boundary-portion pulling bags is a single wire.

Further, the main-portion end wire hangs the main-portion pulling bag into the main-portion pulling slot by bending reaction force generated by bending the opposite end portions of the main-portion end wire.

Further, the main-portion end wire is made from an elastic material.

Further, according to the invention, there is provided another vehicle seat including: a pad assembly having a plurality of pulling slots extending in directions crossing one another; and a cover assembly having a plurality of pulling bags to be pulled into the pulling slots correspondingly and respectively so that the cover assembly covers a surface of the pad assembly; wherein insert wires are embedded in bottom portions of the pulling slots except at least one pulling slot, while end wires are inserted into all of the pulling bags respectively; and wherein opposite end portions of the end wire to be inserted into the pulling bag to be pulled into the at least one pulling slot are bent, the bent opposite end portions are linked with the end wires of the pulling bags to be pulled into the pulling slots other than the at least one pulling slot, and when the end wire with the bent opposite end portions linked is forced into the at least one pulling slot, the pulling bag having the end wire inserted thereto is pulled into the at least one pulling slot.

DETAILED DESCRIPTION OF THE PREFERRED EMBODIMENTS

A preferred embodiment of the invention will be described below in detail with reference to the accompanying drawings.

Figure 1:
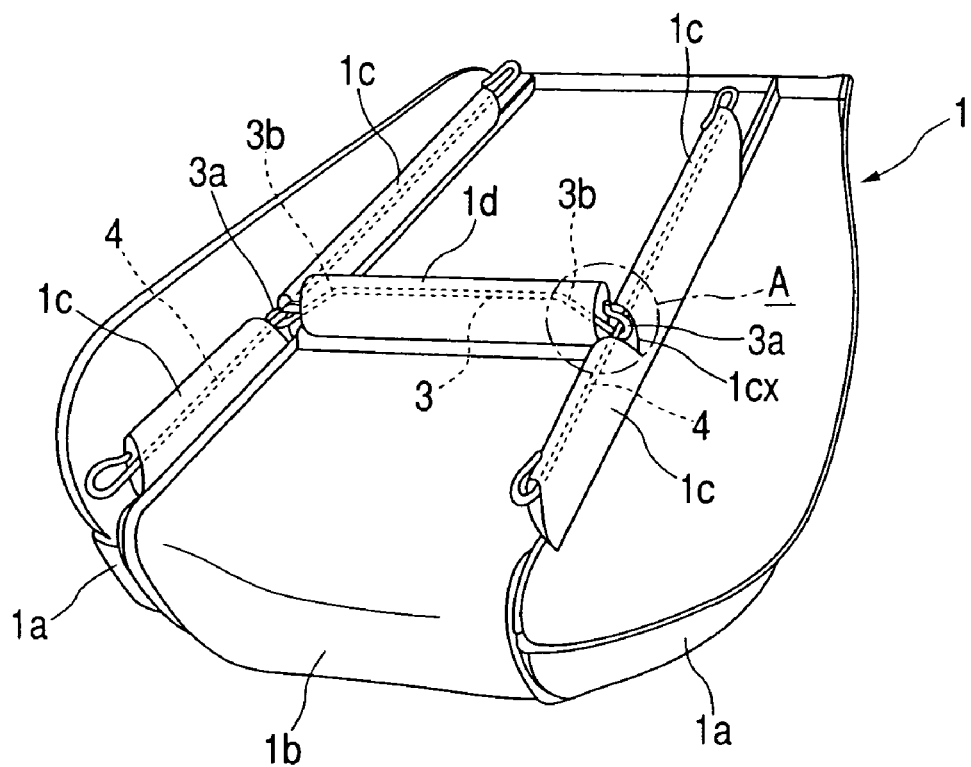
FIG. 1 is a perspective view of the back side of a cover assembly of a vehicle seat using a main-portion end wire according to an embodiment of the invention.
Figure 2:
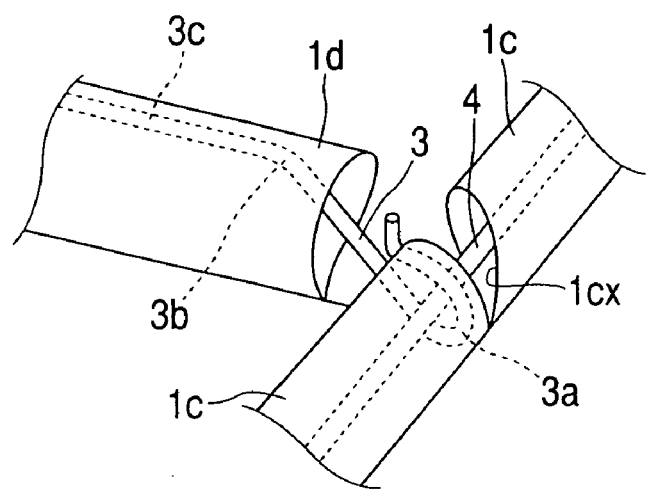
FIG. 2 is an enlarged view of the portion A in FIG. 1.

FIG. 1 is a perspective view of the back side of a cover assembly of a vehicle seat according to an embodiment of the invention, and FIG. 2 is an enlarged view of the portion A in FIG. 1.

Figure 3:
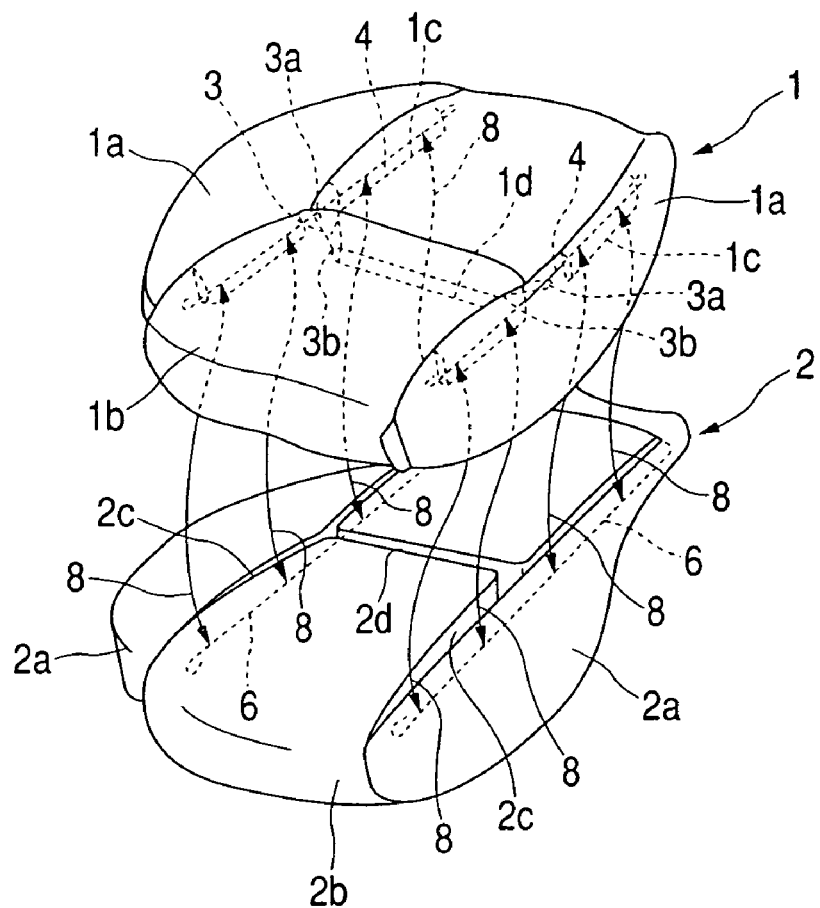
FIG. 3 is a perspective view of the vehicle seat using the main-portion end wire according to the embodiment of the invention viewed from above the seat (from the front side), for explaining a covering method of the vehicle seat.
Figure 4:
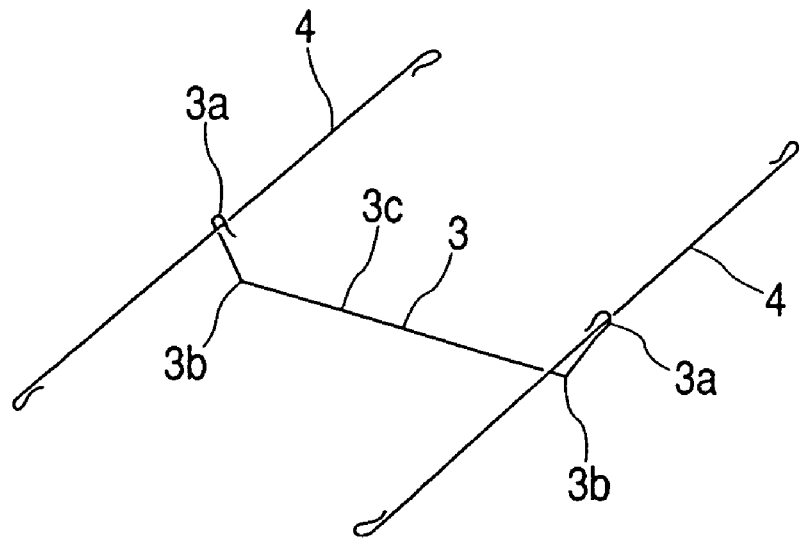
FIG. 4 is a perspective view of the arrangement of end wires in the vehicle seat using the main-portion end wire according to the embodiment of the invention, viewed from above the seat (from the front side)

FIG. 3 is a perspective view of the vehicle seat according to the invention viewed from above the seat (from the front side), for explaining a covering method of the vehicle seat. FIG. 4 is a perspective view of the arrangement of end wires in the vehicle seat according to the invention viewed from above the seat (from the front side).

The vehicle seat according to the embodiment of the invention shown in FIGS. 1 to 4 is constructed in a covering method using pulling wires substantially the same as that in the related-art seat, except the configuration of a main-portion pulling slot portion in a main portion of the seat. That is, the vehicle seat constituted by side portions formed into somewhat high banks on the opposite sides and a main portion between those side portions has a structure in which a cover assembly 1 having side portions 1*b* and a main portion 1*a* sewn in their boundary portions is put over the surface of a pad assembly 2.

In the pad assembly 2, boundary-portion pulling slots 2*c* and 2*c* for pulling the cover assembly 1 are formed in the boundary portions between the opposite side portions 2*a* and the main portion 2*b* so as to extend in the front/rear direction, while a main-portion pulling slot 2*d* is formed in the intermediate portion of the main portion 2*b* so as to extend in a direction crossing the boundary-portion pulling slots 2*c* and 2*c*.

Boundary-portion insert wires 6 and 6 are embedded in the bottom portions of the boundary-portion pulling slots 2*c* and 2*c* on the opposite sides respectively.

On the other hand, boundary-portion pulling bags 1*c* and 1*c* and a main-portion pulling bag 1*d* each having a cylindrical shape are sewn on the back of the cover assembly 1.

The boundary-portion pulling bags 1*c* and 1*c* are pulled into the boundary-portion pulling slots 2*c* and 2*c* of the pad assembly 2, while the main-portion pulling bag 1*d* is pulled into the main-portion pulling slot 2*d* or the pad assembly 2.

The boundary-portion pulling bags 1*c* and 1*c* are sewn and paired left and right to be located in the boundary portions between the opposite side portions 1*a* and the main portion 1*b* in the cover assembly 1 respectively. A portion corresponding to the main portion in the front/rear portion of the seat is cut off from each or the left and right boundary-portion pulling bags 1*c* and 1*c*. Thus, cut portions 1*cx* are provided.

Boundary-portion end wires 4 and 4 shown in FIGS. 1 to 4 and corresponding to boundary-portion insert wires 6 and 6 are inserted into the left and right boundary-portion pulling bags 1*c* and 1*c* cut thus, respectively. A single wire is used as each of the boundary-portion end wires 4 and 4.

On the other hand, a main-portion end wire 3 shown in FIGS. 1 to 4 and corresponding to the main-portion pulling slot 2*d* is inserted into the main-portion pulling bag 1*d*.

The main-portion end wire 3 is constituted by a straight body portion 3*c*, and hook-like link portions 3*a* provided contiguous to the opposite ends of the body portion 3*c* through bent portions 3*b* respectively. The main-portion end wire 3 is disposed to cross the boundary-portion end wires 4 and 4. The link portions 3*a* on the opposite ends of the main portion end wire 3 are pulled on the boundary-portion end wires 4 and 4 respectively. Thus, the main portion end wire 3 is linked with the boundary-portion end wires 4 and 4.

In the bent portions 3*b*, the opposite end portions of the main-portion end wire 3 are bent at a suitable angle toward the back side of the main portion 1*a* of the cover assembly 1. Thus, the body portion 3*c* is located on the side of the bottom portion of the main-portion pulling slot 2*d* of the pad assembly 2.

This is the most essential point of the invention having the following function/effect.

That is, it is not necessary to fix the main-portion end wire 3 to the main-portion insert wire as in the related art. Only if the main-portion end wire 3 is forced into the main-portion pulling slot 2*d* with the opposite ends of the main-portion end wire 3 regulated by the link portions 3*a*, the main-portion pulling bag 1*d* can be pressed and brought into close contact with the bottom portion of the main-portion pulling slot 2*d* due to bending reaction force generated in the bent portions 3*b*. Thus, the main-portion pulling bag 1*d* can be pulled into the main-portion pulling slot 2*d*.

Consequently, the width of the pulling slots can be reduced to improve the exterior appearance of the seat. In addition, the work of fixation using hog rings which may deteriorate the workability when the pulling slots are made deep can be reduced to the utmost.

In order to make the effective use of the bending reaction force, it is desired that the main-portion end wire 3 is made from an elastic material such as a spring material having rigidity high enough not to be deformed permanently when it is pulled.

As shown in FIGS. 1 and 2, the cut portion 1*cx* of each boundary-portion pulling bag 1*c* is disposed to expose the link portion 3*a* where the boundary-portion end wire 4 links with the main-portion end wire 3 of the main portion. Thus, the boundary-portion end wires 4 can be linked with the main-portion end wire 3 easily from the outside.

The vehicle seat according to the invention is assembled as follows. That is, the cover assembly 1 is put over the surface of the pad assembly 2. Then, the boundary-portion pulling bags 1*c* and 1*c* having the boundary-portion end wires 4 and 4 inserted thereto on the opposite sides are pulled into the boundary-portion pulling slots 2*c* and 2*c* of the pad assembly 2. On the other hand, the main-portion pulling bag 1*d* having the main-portion end wire 3 inserted thereto is pulled into the main-portion pulling slot 2*d* of the pad assembly 2. Then, the boundary-portion end wires 4 and 4 on the opposite sides are fixed to the boundary-portion insert wires 6 and 6 of the pad assembly 2. On the other hand, the main-portion end wire 3 is forced into the main-portion pulling slot 2*d* of the pad assembly 2.

The fixation of the boundary-portion end wires 4 and 4 to the boundary-portion insert wires 6 and 6 is performed by pulling hog rings 8 such as C-rings on the boundary-portion insert wires 6 and 6 corresponding to the boundary-portion end wires 4 and 4 as shown by the arrows in FIG. 3. When the hog rings 8 are used, each boundary-portion end wire 4, 4 and each boundary-portion insert wire 6, 6 are fixed at a plurality of places in their length direction because of the necessity of preventing the cover assembly 1 from rising away from the pad assembly 2 In FIG. 3, fixation on each boundary-portion insert wire 6, 6 is performed at four places. Thus, fixation is performed at 8 places in total.

That is, according to the embodiment, the cover assembly 1 is pulled in the boundary portions, with a boundary-portion end wire 4, 4 continuous as a single wire on each of opposite sides and linking with the link portion 3*a*, 3*a* at each of opposite ends of the main-portion end wire 3. In the related-art structure, however, each boundary-portion end wire on each of opposite sides is divided into two and has no linkage with the main-portion end wire. Incidentally, it is in the same manner as in the related art that each boundary-portion end wire 4 is fixed to the boundary-portion insert wire 6 at a plurality of places by means of the hog rings 8.

As described above in detail, according to the embodiment, excellent effect unknown in the related art is shown as follows.

As for the number of parts for pulling the cover assembly, for example, in the case where one main-portion pulling slot is provided in the seat main portion, in comparison with the related-art method, the number of end wires is reduced from 5 in the related art to 3 in the invention; the number of insert wires is reduced from 3 in the related art to 2 in the invention; and the number of hog rings is reduced from 10 in the related art to 8 in the invention. Thus, according to the invention, the number of man-hours and the weight for the work of pulling can be reduced while the cost can be reduced (improvement of working efficiency and economical efficiency, and reduction in weight).

Although the embodiment described above shows an example in which one main-portion pulling slot portion is provided, it is a matter of course that two or more main-portion pulling slot portions may be provided in accordance with necessity.

Figure 5:
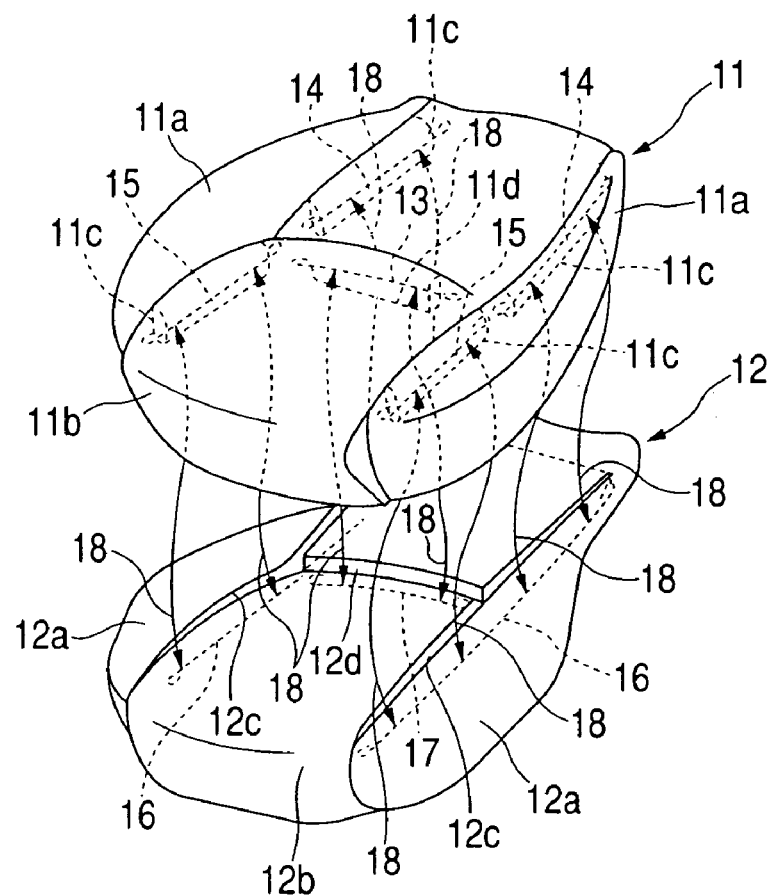
FIG. 5 is a perspective view of a vehicle seat viewed from above the seat (from the front side) for explaining a covering method using pulling wires in the related art.
Figure 6:
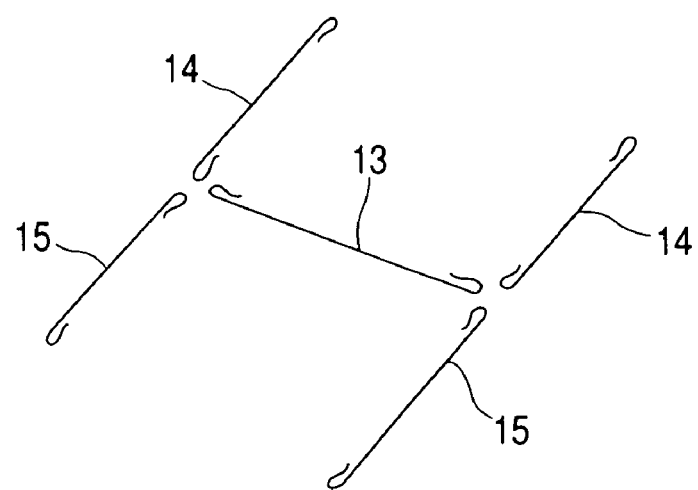
FIG. 6 is a perspective view of the arrangement of end wires in the vehicle seat using the pulling wires in the related art, viewed from above the seat (from the front side).

Further, although in the embodiment described above each of the left and right boundary-portion pulling bags 1*c* and 1*c* has a cut portion 1*cx*, it is possible to modify it in such a manner that each of the left and right boundary-portion pulling bags 1*c* and 1*c* is divided into two in the front/rear direction of the seat as shown in FIG. 5.

Figure 3A:
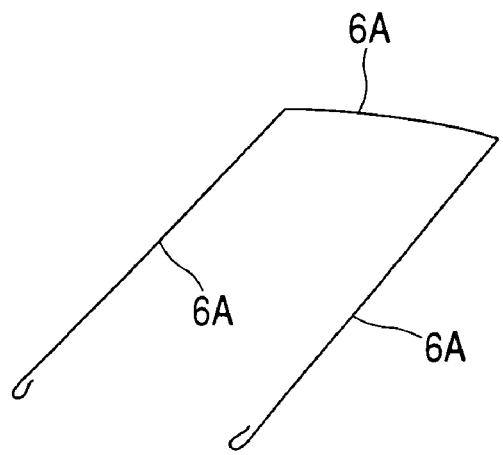
FIG. 3A is a perspective view of a boundary-portion insert wire in the vehicle seat according to a modification of the embodiment of the invention.

Furthermore, although in the embodiment described above each of the boundary-portion insert wires 6, 6 is made from a single wire, it is possible to modify it in such a manner that both of the boundary-portion insert wires 6, 6 are made from a U-shaped single wire 6A as shown in FIG. 3A. Accordingly, the number of inset wires can be reduced.

Figure 4A:
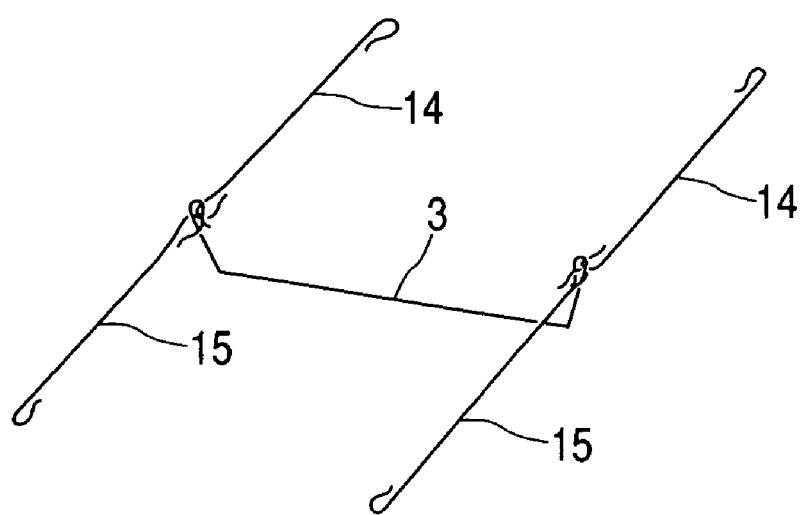
FIG. 4A is a perspective view of the arrangement of end wires in the vehicle seat using the main-portion end wire according to a modification of the embodiment of the invention, viewed from above the seat (from the front side)

Moreover, although in the embodiment described above each of the boundary-portion end wires 4, 4 is made from a single wire an intermediate portion of which is connected with the main-portion end wire 3, it is possible to modify it in such a manner that each of the boundary-portion end wires 4, 4 is made from boundary-portion end wires 14 and 15 as shown in FIG. 4A.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As described above in detail, according to the invention, excellent effect unknown in the related art is shown as follows.

Even when pulling slots are made deep and narrow for improving the attractive appearance, particularly the main-portion insert wire and the fixation thereto using hog rings can be dispensed with in the invention. Accordingly, in the main portion, the work of pulling is made easier by pulling with the main-portion end wire having a bent shape, while there is no intensive pulling in any fixation portion using a hog ring. Thus, uniform finishing can be attained. In other words, improvement of workability and exterior appearance can be seen.

With the present invention, the number of parts for pulling the cover assembly can be reduced. Particularly, for example, in the case where one main-portion pulling slot is provided in the seat main portion, in comparison with the related-art method, the use of the main portion insert wire can be eliminated, so that the number of hog rings can decrease. Thus, according to the invention, the number of man-hours and the weight for the work of pulling can be reduced while the cost can be reduced by improvement of working efficiency and economical efficiency, reduction in weight, and so on.

What is claimed is:

1. A seat comprising:
a pad assembly having a main portion and side portions, the main portion interposed between the side portions, the side portions including boundary-portion pulling slots wherein boundary-portion insert wires having hook ends are disposed along bottom portions of said boundary-portion pulling slots, and the main portion including a main-portion pulling slot disposed substantially perpendicular to the boundary-portion pulling slots;
a cover assembly covering a surface of the pad assembly, the cover assembly including boundary-portion pulling bags pulled into the boundary-portion pulling slots respectively and a main-portion pulling bag pulled into the main-portion pulling slot, wherein boundary-portion end wires having exposed hook ends are inserted into said boundary-portion pulling bags and fixed to said boundary-portion insert wires respectively; and
a main-portion end wire inserted into the main-portion pulling bag, the main-portion end wire having a straight line portion and bent portions positioned at both ends of the straight line portions, and exposed hook portions positioned at both ends of the bent portions, the main-portion end wire being placed into the main-portion pulling slot with the exposed hook ends of said bent opposite end portions linked with the boundary-portion end wires respectively.

2. The seat according to claim 1, wherein each of said boundary-portion end wires inserted into said boundary-portion pulling bags is a single wire.

3. The seat according to claim 1, wherein said main-portion end wire hangs said main-portion pulling bag into said main-portion pulling slot by bending reaction force generated by bending said opposite end portions of said main-portion end wire.

4. The seat according to claim 1, wherein said main-portion end wire is made from an elastic material.

5. The seat according to claim 2, wherein said main-portion end wire is made from an elastic material.

6. The seat according to claim 3, wherein said main-portion end wire is made from an elastic material.

7. The seat according to claim 1, wherein each of said boundary-portion end wires is formed from a single wire, wherein said bent opposite end portions of said main portion end wire are linked with intermediate portions of said boundary-portion end wires respectively.

8. The seat according to claim 1, wherein said boundary-portion insert wires are made from a U-shaped single insert wire.

9. A seat comprising:
a pad assembly having a plurality of pulling slots extending in directions crossing one another; and
a cover assembly having a plurality of pulling bags pulled into said pulling slots correspondingly and respectively so that said cover assembly covers a surface of said pad assembly;
wherein at least one insert wire with hook ends is embedded in bottom portions of said pulling slots except at least one pulling slot, while end wires with exposed hook ends are inserted into all of said pulling bags respectively; and
wherein at least one said end wire includes a main-wire end portion, said main-wire end portion having a straight line portion and bent portions positioned at both ends of the straight line portions, and exposed hook portions positioned at both ends of the bent portions; and
wherein when said bent portions of said main-wire end portion inserted into one of said pulling bags are pulled into said at least one pulling slot, said bent opposite end portions with exposed hook portions are hooked with said end wires of said pulling bags pulled into said pulling slots other than said at least one pulling slot, and when said main-wire end portion with hooked bent opposite end portions is forced into said at least one pulling slot, said pulling bag having said main-wire end portion inserted thereto is pulled into said at least one pulling slot.

10. The seat according to claim 9, wherein said at least one insert wire is formed from a U-shaped single wire.

11. The seat according to claim 9, wherein said at least one insert wire comprises two insert wires.

12. A seat comprising:
a pad assembly having a main portion and side portions, the main portion interposed between the side portions, the side portions including boundary-portion pulling slots wherein boundary-portion insert wires are disposed along bottom portions of said boundary-portion pulling slots, and the main portion including a main-portion pulling slot disposed substantially perpendicular to the boundary-portion pulling slots;
a cover assembly covering a surface of the pad assembly, the cover assembly including boundary-portion pulling bags pulled into the boundary-portion pulling slots respectively and a main-portion pulling bag pulled into the main-portion pulling slot, said boundary-portion pulling bags having cut portions at intermediate portions thereof, wherein boundary-portion end wires are inserted into said boundary-portion pulling bags and fixed to said boundary-portion insert wires respectively, and said boundary-portion end wires being exposed at said cut portions thereof; and
a main-portion end wire inserted into the main-portion pulling bag, the main-portion end wire having opposite end portions bent, the main-portion end wire being placed into the main-portion pulling slot with the bent opposite end portions linked with the boundary-portion end wires respectively.

13. The seat according to claim 1, wherein the main-portion end wire is a single wire.

* * * * *